March 9, 1943.    R. A. GOEPFRICH    2,313,432
BRAKE
Filed Oct. 12, 1940    2 Sheets-Sheet 1

INVENTOR
RUDOLPH A. GOEPFRICH
BY M. W. McConkey
ATTORNEY

March 9, 1943.       R. A. GOEPFRICH       2,313,432
BRAKE
Filed Oct. 12, 1940       2 Sheets-Sheet 2
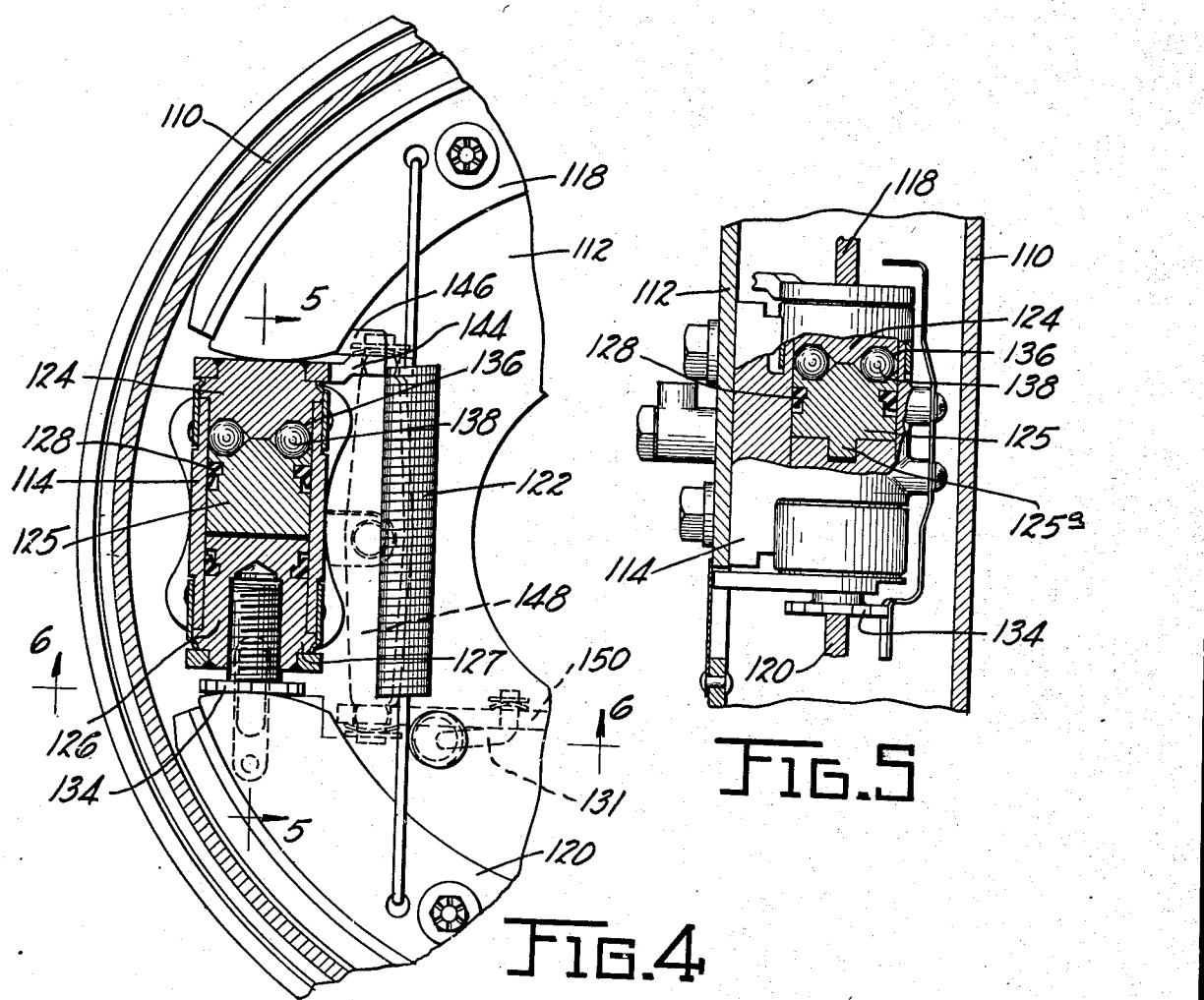
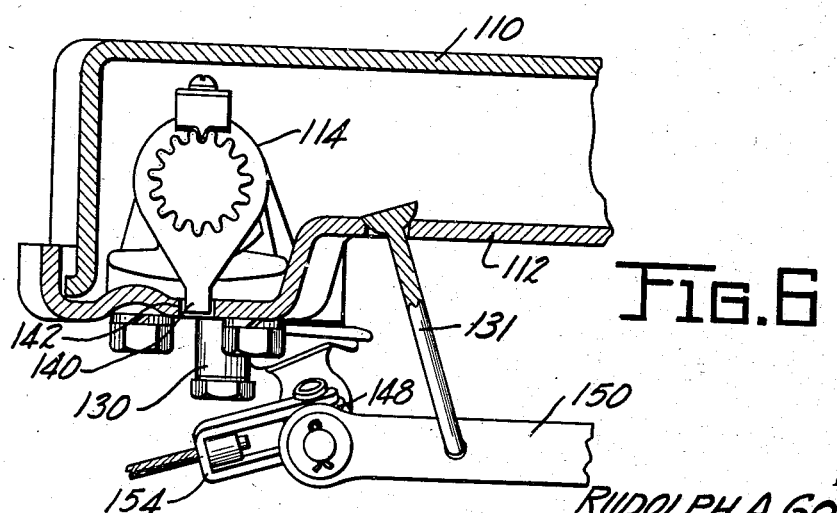
INVENTOR
RUDOLPH A. GOEPFRICH
BY
M. W. McConkey
ATTORNEY Patented Mar. 9, 1943

2,313,432

UNITED STATES PATENT OFFICE 2,313,432

BRAKE

Rudolph A. Goepfrich, South Bend, Ind., assignor to Bendix Aviation Corporation, South Bend, Ind., a corporation of Delaware Application October 12, 1940, Serial No. 360,871

11 Claims. (Cl. 188—106)

This invention relates to brakes and more particularly to novel means for applying brake actuating thrust to the expansible friction elements of a brake.

The brake which I shall show and describe in this application has a pair of shoes which are individually floating to anchor at one end or the other depending upon the direction of rotation of the brake drum. It is one of the chief objects of my invention to provide in connection with a brake having such individually shiftable or floating shoes, a parking brake applying means which will satisfactorily operate a brake of this general type. It has been a problem in connection with brakes having individually shiftable shoes to provide a satisfactory auxiliary or parking brake which will allow the shoes to shift individually under the impulse of the auxiliary braking means as well as under the impulse of the service brake.

A second object of my invention is to provide a brake which can be actuated with a high degree of effectiveness by both the service and the auxiliary brake and which at the same time may be reasonably manufactured and conveniently assembled.

An interesting feature of my brake is the use of pistons within hydraulic wheel cylinder units as thrust connections for actuation of the emergency or auxiliary brake.

Other advantages and features of my invention will be apparent during the course of the ensuing description, reference being had therein to the accompanying drawings, in which:

Figure 4 is a vertical section through a brake in a plane just inside the head of the brake drum showing a modification of the brake actuating means of Figure 1;

Figure 5 is a section taken on the line 5—5 of Figure 4; and

Figure 6 is a section taken on the line 6—6 of Figure 4.

Figure 1:
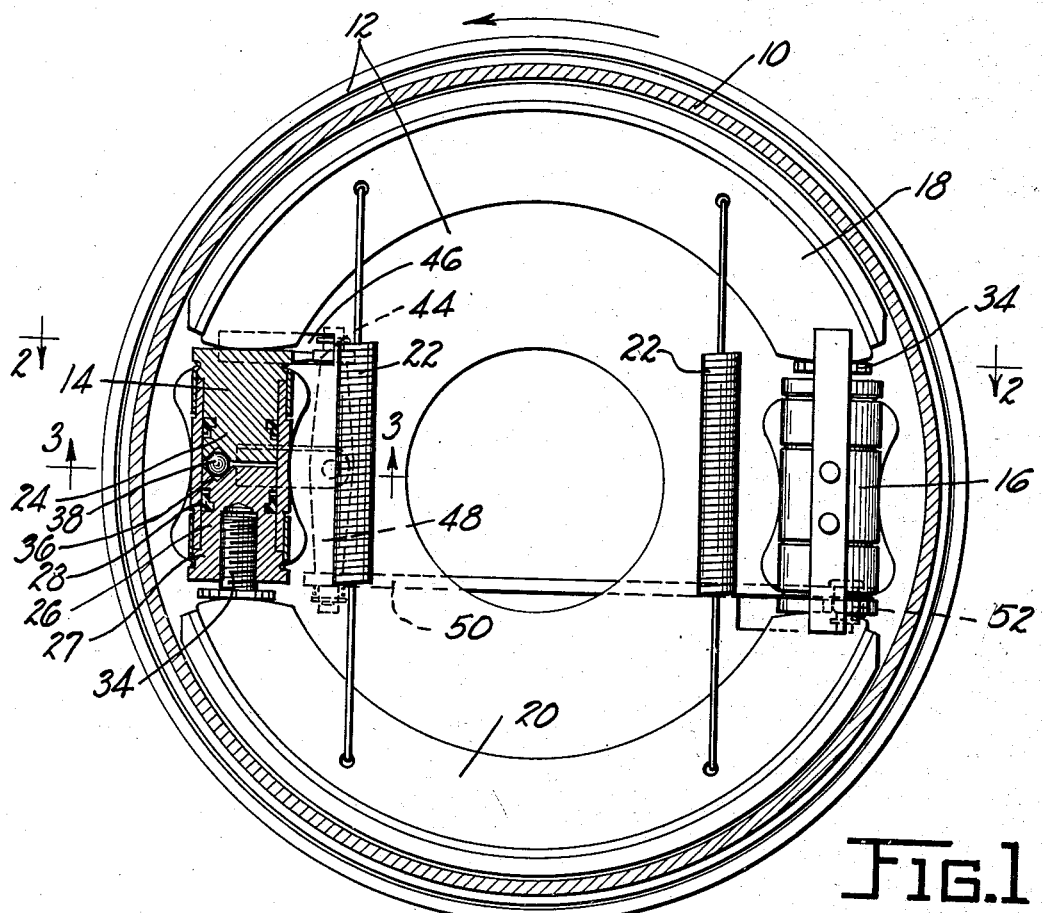
Figure 1 is a vertical section through the brake in a plane just inside the head of the brake drum with the shoes and hydraulic cylinders shown in side elevation.

The brake shown in Figure 1 includes a rotatable brake drum 10 and a non-rotatable assembly comprising a backing plate or support 12, a pair of brake applying means as hydraulic cylinders 14 and 16 and a pair of individually shiftable brake shoes 18 and 20. The cylinders 14 and 16 are secured by any suitable means to the backing plate 12 and serve not only as the applying means for moving the shoes into contact with the drum but also as anchors for one or the other ends of each of the shoes, depending upon the direction of drum rotation. The shoes are normally maintained in released position by means of return springs 22 which connect the shoes at spaced points thereof.

Figure 3:
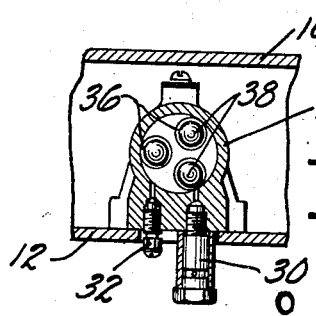
Figure 3 is a partial section taken on the line 3—3 of Figure 1.

Within each of the cylinders 14 and 16 are a pair of pistons 24 and 26, each having an annular groove therein to support and contain an annular packing cup 28 for preventing the escape of liquid from the cylinder. The pistons are each provided with integral flanges 27 adjacent their outer ends and arranged at times to contact the cylinder casing, preventing further inward movement of the pistons. As shown in Figure 3 an inlet 30 for hydraulic fluid is provided in the cylinder adjacent the backing plate, as well as a bleeder opening 32. An adjusting screw 34 is screwed into the outer end of each of the pistons 26 and engages with its head the adjacent end of the brake shoe 18 or 20. As will be well understood by those versed in the art, hydraulic fluid admitted under pressure through the inlet 30 will flow into the narrow opening between the pistons 24 and 26, causing the said pistons to spread apart and move the ends of the brake shoes toward frictional contact with the brake drum. Since the same operation occurs in both of the cylinders 14 and 16 the effect will be a balanced brake applying effort applied between the shoes at both ends thereof. If the brake is rotating in a forward direction as indicated by the arrow in Figure 1 the shoe 18 will, under the influence of the wrapping action caused by contact with the drum, anchor on the piston 24 of cylinder 14 while the brake shoe 20 will anchor on the piston 24 of cylinder 16. The pistons in turn transmit the brake torque through their flanges 27 to the casing of the respective cylinders, the cylinders being secured to the backing plate as indicated above. When the brake has been released and the fluid in the wheel cylinder is no longer under pressure the shoes will return under the influence of the return springs 22 to their original positions. If the direction of rotation is opposite to the direction of the arrow of Figure 1 the shoes will anchor through the adjusting screws 34 on the pistons 26 in the respective cylinders 14 and 16. During application of the brakes there is a tendency of the shoes to move lengthwise, i. e., either toward the right or left of the brake shown in Figure 1. This is possible because the ends of the brake shoes are capable of sliding along the surfaces on which they anchor. After the brakes have been released the eccentricity of the brake drum which is almost certain to exist will kick or tend to kick the shoes back to their original position.

The means for applying the parking or auxiliary brake will now be specifically described. As will be noted in Figures 1 and 3, each of the pistons 24 and 26 has in its inner face a plurality of cone shaped indentations or recesses 36. The indentations 36 are grouped in pairs so that each indentation of each piston is directly opposite to a complementary indentation in the other piston. In each of the openings thus formed by the opposed pairs of indentations is inserted a rotatable element or ball 38. It will be apparent that rotation of one of the pistons relative to the other piston in the same cylinder will cause the balls to climb or attempt to climb the sides of the indentations and will cause a spreading of the pistons to move the shoes into brake applying position. Obviously, the particular shape of the indentation or type of the element inserted therein is not important. The indentation could be shaped as a hemisphere or it might have a pair of inclined sides meeting at the lowermost point of the indentation. Many other specific shapes and arrangements might be used. In place of the ball element might be inserted a pin, under certain circumstances a cube, or any one of a large number of substitutes. The combination shown in the drawings in this application is believed by applicant to be the most effective combination for producing the results desired, but it will be obvious that many other such combinations might be substituted without departing from the scope of the invention described herein.

The means for causing relative rotation of the two pistons within either of the two cylinders are arranged as follows. An arm 40 integral with the piston 26 extends through an opening 42 in the backing plate and serves to prevent rotation of the piston 26. An arm 44 is provided integral with the piston 24. This arm extends through an opening 46 in the backing plate, the said opening being of sufficient length to allow substantial rotation of the arm 44. The arm 44 is secured at its outer end (i. e., the end farthest from the piston 24) to a crossbar 48, shown in dotted lines on Figure 1. The end of the crossbar opposite its connection to the arm 44 has secured to it a link 50 extending across the brake and connected to an arm 52 which is integral with the piston 24 (not shown) in the hydraulic cylinder 16. Midway of the crossbar 48 a clevis 54 is affixed thereto. When the parking brake of the vehicle incorporating my brake assembly is actuated, a suitable mechanical linkage (not shown) pulls to the left on the clevis 54 with the result that an equalized force is applied through the crossbar 48 to the arm 44 and to the link 50. This causes the simultaneous rotation of the arm 44 and the arm 52, turning the pistons 24 in their respective cylinders 14 and 16. Since the pistons 26 are, in each of the cylinders 14 and 16, held against rotation by the arm 40 which extends through the backing plate, rotation of the pistons 24 will move the indentations in pistons 24 out of alignment with the indentations in pistons 26. The balls 38 will be forced by this relative movement of the pistons to move up the inclined sides of the indentations with the result that the balls will act as wedges in forcing apart the pistons 24 and 26, moving the shoes outward into contact with the drum.

It will be apparent that I have provided an extremely simple and yet effective device for actuating an auxiliary brake, utilizing the pistons of the service hydraulic brake to convey thrust to the ends of the brake shoes.

Figure 2:
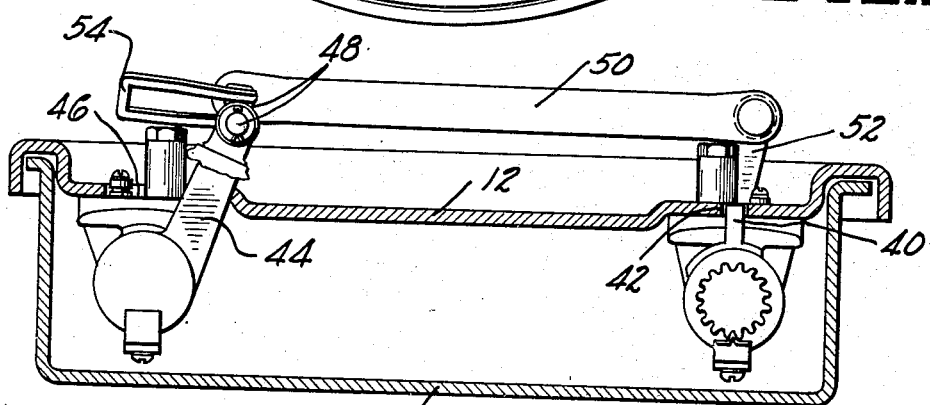
Figure 2 is a section taken on the line 2—2 of Figure 1, showing the mechanical applying linkage for the emergency or auxiliary brake.

In Figures 4 to 6 I have shown a modification of the brake of Figures 1 to 3. Inasmuch as the modified device is substantially similar to the original device, I have used the same numerals in Figures 4 to 6 as used in Figures 1 to 3 with the addition of 100 in each instance.

It will be noted that the cylinder 114 of the modification includes three piston members therein, 124, 125 and 126. The grooves 136 and the balls 138 are provided adjacent the contact plane of piston 124 with piston 125. It will be noted that the shape of the indentations is different in this modification from the modification of Figure 1 and that in this instance four balls are provided instead of three as in Figure 1. An extension 125a on one end of the piston 125 extends into a complementary recess in the face of the piston 126 and prevents the rotation of piston 125 relative to piston 126. A positioning element 131 is connected at one end to the link 150 and at the other end has an enlarged portion resting on the far side of the backing plate to prevent undue movement of the link of the piston-turning assembly.

The operation of the device is substantially the same as the operation of the device of Figure 1. Force exerted through the parking brake linkage moves the cross bar 148 to simultaneously turn the two pistons 124 in the respective cylinders. This causes the ball elements 138 to act as wedges in forcing apart the pistons 124 and 125 with the resultant application of the brake.

While I have described two specific embodiments of my invention, it is not my intention to be limited to the embodiments or otherwise than by the terms of the appended claims.

I claim:

1. A brake comprising a brake drum, a pair of brake shoes individually shiftable to anchor at either end according to the direction of drum rotation, applying and anchoring means between the ends of said shoes comprising a fixed stationary cylinder, a pair of opposed pistons in the cylinder each having a flange for transmitting anchoring torque from the shoe to the cylinder and a plurality of indentations in the face thereof, thrust applying elements inserted in said indentations, and means including one of said pistons and an arm on the flange thereof for actuating said thrust applying elements to spread the pistons.

2. A brake comprising, in combination with a drum and with anchorage and applying means, a plurality of brake shoes each of which is shiftable individually to anchor at either end according to the direction of drum rotation, return springs tensioned to hold the shoes yieldingly away from the brake drum during brake release, the aforesaid applying means including a pair of hydraulic cylinders each having a plurality of pistons therein, hydraulic means for simultaneously spreading the pistons in both cylinders, and mechanical means for simultaneously spreading the pistons in both cylinders, said mechanical means including arms on at least one piston in each cylinder and a tension element connected to both of said arms for exerting an equalized force tending to pull the arms and thereby turn their associated pistons.

3. A brake comprising a drum, a plurality of brake shoes each of which is individually shiftable to anchor at either end according to the direction of drum rotation, hydraulic cylinders adjacent the ends of said shoes and horizontally across the drum from one another, means associated with said cylinders for anchoring the shoes, springs for yieldingly holding the shoes in brake released position, means for admitting fluid to the hydraulic cylinders to spread the shoes, sealing means associated therewith, mechanical means for applying equalized force to spread the shoes at a point adjacent each of the hydraulic cylinders, and a tension element for actuating the said mechanical means, said tension element extending to the mechanical means on a substantially horizontal line.

4. A brake having a pair of shoes individually shiftable to different anchorage positions, applying means therefor including a pair of wheel cylinders, a plurality of pistons in each of said wheel cylinders, hydraulic means for spreading said pistons, means for rotating one of said pistons in each cylinder relative to the other of said pistons in each cylinder, and means for spreading the said pistons whenever such relative rotation occurs.

5. Brake applying means comprising a pair of hydraulic cylinders, a pair of pistons in each of said cylinders, a pair of arms each associated with one of the pistons in one of the hydraulic cylinders, a bar connected at one point to one of said arms and at another point to the other of said arms, and means for moving said bar to cause simultaneous rotation of a piston in each cylinder under the influence of its associated arm.

6. A brake assembly embodying main and auxiliary brake applying means comprising a brake drum, a pair of brake shoes which in either main or auxiliary application anchor at one end or the other according to the direction of drum rotation, a pair of hydraulic cylinders between the ends of the shoes arranged to spread the shoes into engagement with the drum, a plurality of piston members in each of said hydraulic cylinders, fluid means for spreading the pistons to move the shoes against the drum, and mechanical means for spreading the pistons to exert therethrough thrusting force against the shoes.

7. In a brake assembly having main and auxiliary brake applying means, a brake drum, a plurality of brake shoes which in either main or auxiliary application anchor at one end or the other under the influence of the drum, a plurality of hydraulic cylinders between the ends of the shoes arranged to move the shoes into engagement with the drum, a plurality of piston members in each of said hydraulic cylinders, fluid means for simultaneously spreading the pistons in each of the cylinders, said means constituting the main brake applying means, means for simultaneously in each cylinder rotating one of the piston members therein relative to another, and means in each of the cylinders for spreading the pistons therein in response to the aforesaid rotation of one of the pistons therein, said last-named means constituting the auxiliary brake applying means.

8. Main and auxiliary means for applying brakes comprising a rotatable brake drum, a plurality of friction elements for at times retarding rotation of said drum, each of said friction elements being adapted during either main or auxiliary brake application to anchor at one end or the other under the influence of the drum, and a plurality of brake applying means each including a piston having an indentation therein, fluid means for moving said piston axially, means for rotating said piston, and means in the indentation for moving said piston axially in response to rotation of the piston.

9. A brake comprising, in combination, a rotatable brake drum, friction means for at times retarding rotation of said drum, a hydraulic cylinder for actuating the friction means, a piston reciprocable in the cylinder and having an outer flange for at times transmitting anchoring torque from the friction means to the cylinder, fluid means for moving said piston axially, and mechanical means for moving said piston axially including an arm on the piston flange for rotating the piston and camming means for moving the piston axially in response to such rotation.

10. A brake comprising, in combination with a drum and with anchorage and applying means, a plurality of brake shoes each of which is shiftable individually to anchor at either end according to the direction of drum rotation, return springs tensioned to hold the shoes yieldingly away from the brake drum during brake release, the aforesaid applying means including a pair of hydraulic cylinders each having a plurality of pistons therein, hydraulic means for simultaneously spreading the pistons in both cylinders, mechanical means for simultaneously spreading the pistons in both cylinders, said mechanical means including arms on at least one piston in each cylinder, a tension element connected to both of said arms for exerting an equalized force tending to pull the arms and thereby turn their associated pistons, and camming means for spreading the pistons in both cylinders whenever certain of the pistons are turned as aforesaid.

11. Brake applying means comprising a pair of hydraulic cylinders, a pair of pistons in each of said cylinders, a pair of arms each associated with one of the pistons in one of the hydraulic cylinders, a bar connected at one point to one of said arms and at another point to the other of said arms, means for moving said bar to cause simultaneous rotation of a piston in each cylinder under the influence of its associated arm, and camming means in each cylinder responsive to the rotation of said pistons to spread the pair of pistons in each cylinder.

RUDOLPH A. GOEPFRICH.